(12) United States Patent
Chen et al.

(10) Patent No.: US 7,944,155 B2
(45) Date of Patent: May 17, 2011

(54) LED DRIVER WITH SINGLE INVERTER CIRCUIT WITH ISOLATED MULTI-CHANNEL OUTPUTS

(75) Inventors: Timothy Chen, Aurora, OH (US);
James K. Skully, Willoughby, OH (US)

(73) Assignee: General Electric Company, Schenectady, NY (US)

( * ) Notice: Subject to any disclaimer, the term of this patent is extended or adjusted under 35 U.S.C. 154(b) by 396 days.

(21) Appl. No.: 12/273,131

(22) Filed: Nov. 18, 2008

(65) Prior Publication Data

US 2010/0123404 A1  May 20, 2010

(51) Int. Cl.
*H05B 39/04* (2006.01)
*H05B 41/36* (2006.01)

(52) U.S. Cl. .............. 315/291; 315/209 R; 315/276; 315/278; 315/297

(58) Field of Classification Search .......... 315/209 R, 315/276, 224, 278, 291, 297, 300, 302, 307, 315/312, 309, 362; 363/17, 21
See application file for complete search history.

(56) References Cited

U.S. PATENT DOCUMENTS

| | | | |
|---|---|---|---|
| 6,369,525 B1 * | 4/2002 | Chang et al. | 315/300 |
| 2002/0145041 A1 * | 10/2002 | Muthu et al. | 235/454 |
| 2005/0269968 A1 | 12/2005 | Ito et al. | |
| 2008/0018261 A1 | 1/2008 | Kastner | |

OTHER PUBLICATIONS

International Search Report issued in connection with corresponding PCT Application No. PCT/ US2009/062929 on Mar. 1, 2010.

* cited by examiner

*Primary Examiner* — Anh Q Tran
(74) *Attorney, Agent, or Firm* — Fay Sharpe LLP

(57) ABSTRACT

A single-converter circuit-based LED driver circuit (10) with isolated multi-channel outputs is disclosed. The circuit (10) includes an IC control circuit (11), a plurality of isolated output channels (70, 74) each having an output current sensing and conditioning circuit (74, 90), and an output current regulation circuit (128). The output current regulation circuit (128) includes a voltage-sensing transformer winding (T4) that senses an output voltage level across a secondary side of the circuit (10), and a peak output current sensing component (156) that senses output currents from the isolated output channels and determines which channel has a highest current output. Additionally, the circuit (10) facilitates providing output current regulation when detected output voltage is below a predetermined threshold, and providing output current regulation when the detected output voltage is above the predetermined threshold.

18 Claims, 3 Drawing Sheets

US 7,944,155 B2

LED DRIVER WITH SINGLE INVERTER CIRCUIT WITH ISOLATED MULTI-CHANNEL OUTPUTS

BACKGROUND OF THE DISCLOSURE

Light emitting diode (LED) lighting systems have been gaining increasing popularity in replacing incandescent and discharge lamps due to their long life, energy efficiency, and flexibility in optical design. As a result, the application of LED systems has come to include not only low-power applications, but also high-power applications. LED systems are also gaining popularity in outdoor applications, in addition to indoor applications. Moreover, LED systems are being used in general applications, and not just in special lighting applications.

For some applications, a Class II isolation for output is required. A typical Class II high-power LED driver design uses a common front-end power factor correction section with either multiple isolated LED converters in parallel, or with multiple single stage isolated LED drivers connected to the same power sources. In such arrangements, component redundancy is undesirably high. Consequently, the cost and size of such arrangements are high and system efficiency is low.

Accordingly, there is an unmet need in the art for systems and methods that facilitate reducing component redundancy and increasing system efficiency in Class-II rated circuits, and for overcoming the deficiencies noted above.

SUMMARY OF THE DISCLOSURE

In accordance with one aspect, a circuit for controlling an LED lighting system comprises a single-converter control circuit with a primary winding T1, and a first isolated output channel circuit with at least one secondary winding T2, T3 tightly coupled to the primary winding T1 and to a first output current sensing and conditioning circuit. The circuit further comprises at least a second isolated output channel with at least one secondary winding T6, T7 tightly coupled to the primary winding T1 and to a second output current sensing and conditioning circuit. The circuit further comprises an output current regulation circuit that determines peak current output through the first and second isolated output channels.

In accordance with another aspect, an LED driver output channel regulation circuit comprises a voltage-sensing winding T4 that senses voltage across a multi-channel secondary circuit, and at least first and second photodiodes that transmit current, the first and second photodiodes being coupled to respective isolated output channel circuits in the secondary circuit. The circuit further comprises a peak current regulation component that compares current transmitted by the photodiodes, determines which of the isolated output channel circuits has a higher peak output current, and regulates the output current thereof.

DETAILED DESCRIPTION OF THE PREFERRED EMBODIMENTS

The following description relates to a single converter circuit-based LED driver with isolated multi-channel outputs. Advantages of the described circuit design include that all outputs meet Class II requirements, only one IC control and converter circuit is used, component count is reduced, and efficiency is improved. That is, the single converter with multiple outputs facilitates providing a circuit at low cost, high efficiency and small size. A half-bridge-based resonant converter is employed as a platform for a high-power LED driver application. However, it will be appreciated that a current-fed, fly-back, or any other isolated circuit platform can be employed in conjunction with the various embodiment set forth herein.

Figure 1:
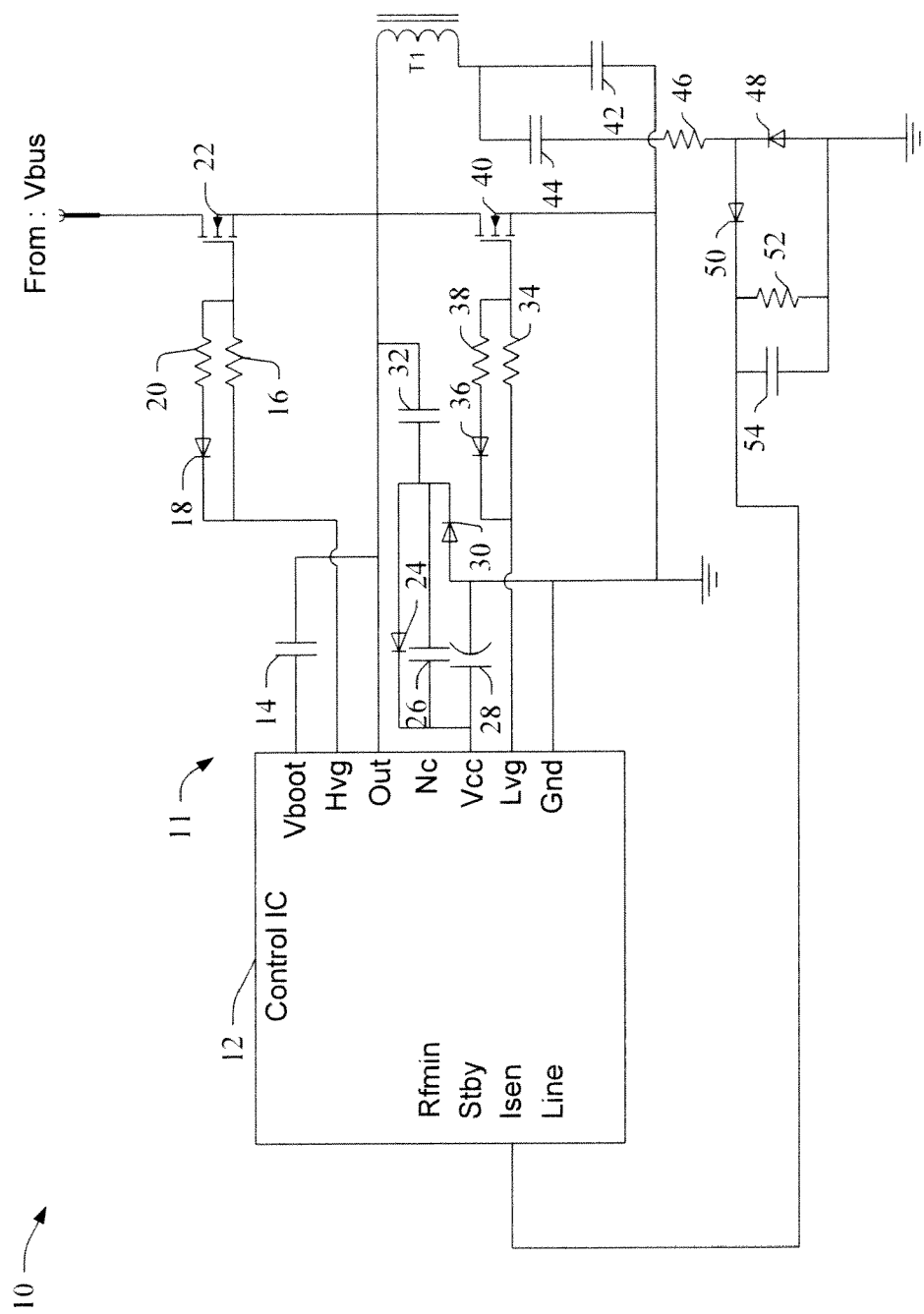
FIG. 1 illustrates a primary side of the circuit, which includes an IC controller and a half-bridge-based resonant converter, in accordance with one or more aspects described herein.
Figure 2:
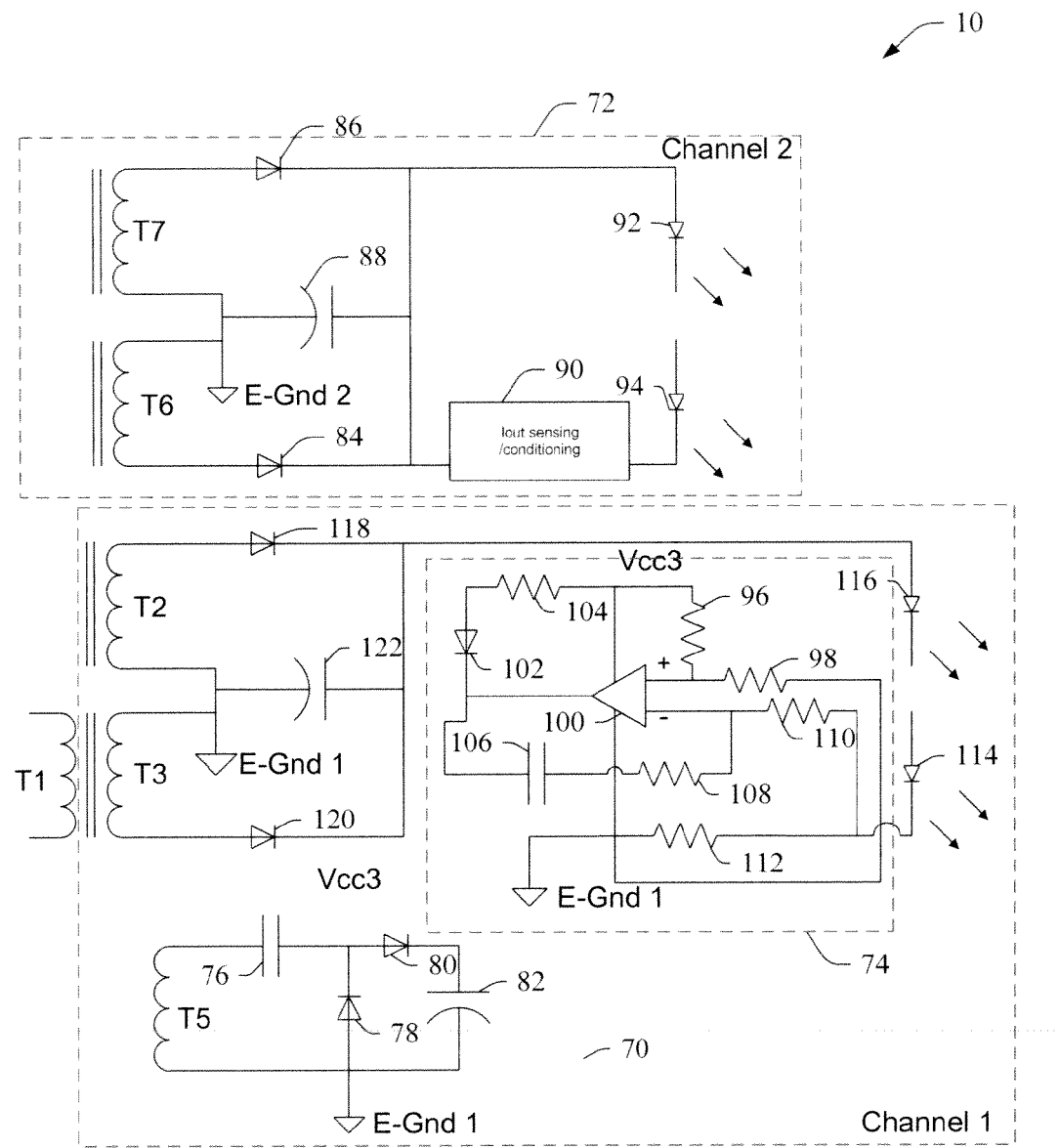
FIG. 2 illustrates a secondary side of the circuit, including multiple isolated output channels, in accordance with one or more aspects described herein.
Figure 3:
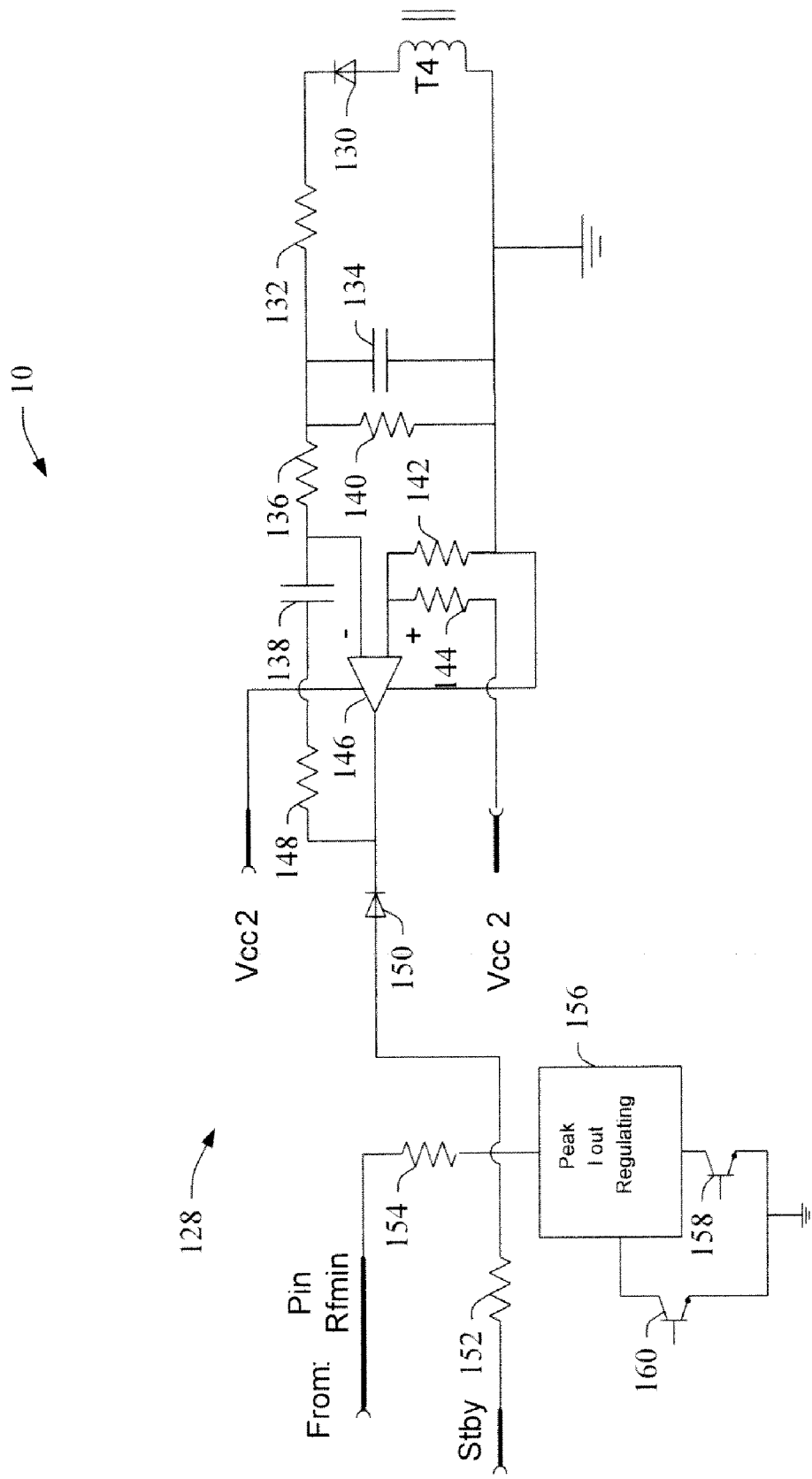
FIG. 3 illustrates a current regulation portion of the circuit, which regulates a channel having a highest sensed output current at any given time, in accordance with one or more aspects described herein.

FIGS. 1-3 illustrate a circuit 10 comprising a single converter circuit-based LED driver with isolated multi-channel outputs, in accordance with various aspects described herein. The following discussion relates to the specific configuration of the circuit 10, and features thereof. As shown in FIG. 1, the circuit 10 comprises a control integrated circuit (IC) 12, which comprises a plurality of input/output (I/O) pins. In one example, the IC 12 is an L6599 IC. A capacitor 14 (e.g., a 0.1 μF capacitor or the like) is coupled to a bootstrapped supply voltage (Vboot) pin on the control IC 12, as well as to a high-side driver reference (Out) pin and a primary transformer winding T1. According to an example, the winding T1 is a G30876 winding. A high-side driver output (Hvg) pin on the IC 12 is coupled to a resistor 16 and diode 18, which in turn is coupled to a resistor 20. Resistors 16 and 20 are coupled to a gate of a switch 22 (e.g., a MOSFET or the like), and the drain of the switch 22 is coupled to a voltage bus. In one example, the resistor 16 is a 20Ω resistor, the diode 18 is a 1N4148 diode, the resistor 20 is a 1 kΩ resistor, and the switch 22 is an 1RF740 MOSFET.

A source voltage (Vcc) pin on the IC 12 is coupled to each of a diode 24, a capacitor 26, and a capacitor 28. The capacitor 28 is coupled to a diode 30, which is coupled to a capacitor 32, as well as to the diode 24, the capacitor 26, and to ground. The capacitor 32 is further coupled the diode 24, the capacitor 26, the capacitor 14, the output pin on the IC 12, and the primary transformer winding T1. According to an example, the diodes 24 and 30 are 1N4148 diodes, the 26 is a 0.1 μF capacitor, the capacitor 28 is a 10 μF capacitor, and the capacitor 32 is a 150 pF capacitor.

The low-side driver output (Lvg) pin on the IC 12 is coupled to a resistor 34 and diode 36, which in turn is coupled to a resistor 38. Resistors 34 and 38 are coupled to a gate of a switch 40 (e.g., a MOSFET or the like), and the drain of the switch 40 is coupled to the source of the switch 22. The source of the switch 40 is coupled to the diode 30, the capacitor 28, a capacitor 42, and to ground. The capacitor 42 is further coupled to the primary transformer winding T1 and to a capacitor 44. In one example, the resistor 34 is a 20Ω resistor, the diode 36 is a 1N4148 diode, the resistor 38 is a 1 kΩ resistor, the switch 40 is an 1RF740 MOSFET, the capacitor 42 is a 15 nF capacitor, and the capacitor 44 is a 100 pF capacitor.

The capacitor 44 is coupled to a resistor 46, which is coupled to diodes 48 and 50. The diode 50 is coupled to a resistor 52 and a capacitor 54, both of which are coupled to ground and to the diode 48, which is also coupled to ground. The diode 50, the resistor 52, and the capacitor 54 are further coupled to a current sensing (Isens) pin on the IC 12. Other pins on the IC (e.g., Nc and Line, etc.) are left unconnected. A ground pin on the IC 12 is coupled to the capacitor 28, the diode 30, and to ground. In one example, the resistor 46 is a 50Ω resistor, diodes 48 and 50 are 1N4148 diodes, the resistor 52 is a 10 kΩ resistor, and the capacitor 54 is a 33 nF capacitor.

Turning now to FIG. 2, with continued reference to FIG. 1, the circuit 10 includes a first isolated output channel 70, a second isolated output channel 72, and an output current sensing and conditioning circuit 74.

The first output channel circuit 70 includes the winding T5, which is coupled to Earth ground1, as well as to a capacitor 76 and a diode 78. The capacitor 76 and diode 78 are coupled to a diode 80, which in turn is coupled to a capacitor 82. The capacitor 82 is coupled to the diode 78, the winding T5, and the Earth ground 1. The circuit further includes secondary transformer windings T2 and T3, both of which are coupled to Earth ground 1 (E-Gnd1), and inductively coupled to winding T1. In one example, the capacitors 76, 82 are 22 nF capacitors, the diodes 78, 80 are 1N4148 diodes, and the windings T2, T3, T5 are G30876 windings.

Winding T5 is tightly coupled to the primary side windings (e.g., T1, T4), and has a voltage source Vcc3 (e.g., a power supply) that ensures a voltage even if the output of channel 1 is shorted.

The second output channel circuit 72 includes the transformer windings T6 and T7. A diode 84 is coupled to winding T6, as well as to a diode 86 that is coupled to winding T7. The diodes 84 and 86 are further coupled to a capacitor 88, which is coupled to the windings T6 and T7 and to Earth ground 2 (E-Gnd2). The diodes 84 and 86, and the capacitor 88, are coupled to an output current (Iout) sensing and conditioning component 90 and to an LED 92. The Iout sensing and conditioning circuit 90 (e.g., similar or identical to the output current sensing and conditioning circuit 74) is coupled to an LED 94. In one example, the diodes 84, 86 are MUR420 diodes, the capacitor 88 is a 100 µF capacitor, and the LEDs are NCSW136 LEDs.

The circuit 10 further includes a resistor 96 and a resistor 98 that are coupled to an amplifier 100. The amplifier 100 is further coupled to a photodiode 102 and a resistor 104, which are also coupled to each other. The amplifier 100 is coupled to a capacitor 106, which is also coupled to the photodiode 102 and a resistor 108. The resistor 108 is coupled to the amplifier 100 and to a resistor 110, which is in turn coupled to a resistor 112 and an LED 114. The resistor 112 is additionally coupled to Earth ground 1 (E-Gnd1). According to an example, the resistor 96 is a 10 kΩ resistor, the resistor 98 is a 1 kΩ resistor, and the amplifier 100 is a LM325 amplifier. In another example, the photodiode 102 is am SFH6106 photodiode, the resistor 104 is a 50Ω resistor, the capacitor 106 is a 22 nF capacitor, the resistor 108 is a 5.6 kΩ resistor, and the resistor 110 is a 1 kΩ resistor. In yet another example, the resistor 112 is a 0.25Ω resistor, and the LED 114 is an NCSW136 LED.

An LED 116 is coupled to a diode 118, a diode 120, and a capacitor 122. The diode 118 is coupled to secondary winding T2, and the diode 120 is coupled to the secondary winding T3. The diodes 118 and 120 are further coupled to the capacitor 122, which in turn is coupled to the secondary windings T2 and T3, and to Earth ground 1 (E-Gnd1). According to an example, the LED is an NCSW136 LED, the diodes 118, 120 are MUR420 diodes, and the capacitor 122 is a 100 µF capacitor.

Now turning to FIG. 3, with continued reference to FIGS. 1 and 2, the circuit 10 includes an output current regulator circuit 128 with a voltage-sensing winding T4 that is coupled to a diode 130, which in turn is coupled to a resistor 132. Winding T4 is tightly coupled to the secondary windings (e.g., T2, T3, T5, T6, and T7) and senses a voltage across the secondary side of the circuit 10 (see FIG. 2). Output voltage increases when there is a light load or no-load condition, such as when one or more LEDs are not connected. If the output voltage reaches or exceeds a predetermined threshold voltage (e.g., approximately 55V or so in one example), then the circuit 10 switches from current regulation to voltage regulation. Output currents for all channels are sensed, and the channel with the highest output current is regulated. According to an example, the winding T4 is a G30876 winding, the diode 130 is a 1N4148 diode, and the resistor 132 is a 100Ω resistor.

The resistor 132 is coupled to a capacitor 134 and a resistor 136, which is further coupled to a capacitor 138. The resistors 132 and 136, and the capacitor 134 are coupled to a resistor 140 which in turn is coupled to a resistor 142 and to the winding T4. The capacitor 134 is coupled to the resistor 136 and to the winding T4, as well as to the resistor 142. In one example, the capacitors 134, 138 are 33 nF capacitors, the resistors 136, 142 are 1 kΩ resistors, and the resistor 140 is a 10 kΩ resistor.

The resistor 142 is further coupled to a resistor 144, which in turn is coupled to a voltage source Vcc2. The resistors 142 and 144 are coupled to an error amplifier 146, which is also coupled to Vcc2. The capacitor 138 is coupled to a resistor 148, which is also coupled to a diode 150. The resistor 148 and diode 150 are coupled to the error amplifier 146, and the diode 150 is further coupled to a resistor 152 that is coupled to a Standby (Stby) pin on the IC 12. According to an example, the resistor 144 is a 10 kΩ resistor, the amplifier 146 is an LM325 amplifier, the resistor 148 is a 6.2 kΩ resistor, and the diode 150 is a 1N4148 diode. In another example the resistor 152 is a 5 kΩ resistor.

A resistor 154 is coupled to a minimum oscillating frequency setting (RfMin) pin on the IC chip 12 and to a peak output current regulating component 156. The regulating component 156 is further coupled to phototransistors 158 and 160, which in turn are coupled to each other and to ground, and which receive current signal from the photodiode 102 and equivalent photodiodes in other isolated channels (e.g., such as a second photodiode in the output current sensing and conditioning circuit 90). According to an example, the resistor 154 is a 4.7 kΩ resistor the current regulating component 156 is a G20678 component, and the phototransistors 158, 160 are SFH6106 phototransistors.

Still referring to FIGS. 1-3, in the main transformer, all isolated windings are tightly coupled to each other to ensure that even with unbalanced loads on each output, the voltages on each output are equal to each other with minimum error. In each channel, the output current is sensed and fed back to the primary side (e.g., FIGS. 1 and 3) to control and regulate the output current. Although all the outputs' currents are sensed, it is the highest current in the outputs that is regulated. The voltage and current characteristic of the photodiodes and error amplifiers are used to determine the other channel's current. In one embodiment, each channel employs the same type and numbers of LEDs, which are connected in series with even thermal distribution.

As shown in the Figures, the two secondary outputs are tightly coupled together for matching voltage at the output of each channel. Each channel drives the same type and number of LEDs in a series parallel configuration. On each channel, there are two windings, T2 and T3, on secondary outputs with the common tie to the E-Gnd1. The diodes 118 and 120 are connected to T2 and T3 respectively to charge 122 and maintain the energy on the cap 122 and current to the LEDs 114, 116.

The sensing resistor 112 senses the channel output current, and the amplifier 100 further conditions the sensed signal and drives cathode of an optocoupler (which communicate signal(s) to phototransistors 158, 160). The amplifier 100 has a non-inverting input that is connected to a scaled down reference and inverting input via resistor 110 connected to sensing resistor 112. The windings T2, T3, which are tightly coupled to the primary winding T1 and isolated from the main power converter, provide the power supply for the first channel 70. The second channel 72 is configured the same as the first channel 70, but isolated by the separated windings T6, T7. Additional channels can be added in the same fashion as the second channel 72. Therefore, all the channels are isolated from the main power converter to meet Class II requirements.

On each channel, the optocoupler feeds back the output current signal to the peak current regulator 156. The channel with the highest output current is regulated at any given time. In the event that a light load or no load condition is present in an output channel, voltage on the winding T4, which is tightly coupled to secondary of the output transformer, is indicative of the voltage on the output channels. This voltage is processed by error amplifier 146 to take over the control loop to regulate the maximum output voltage.

Accordingly, the circuit 10 facilitates sensing output currents for a plurality of isolated output channels and regulating the current of the channel with the highest output current at a given time. In this manner, the circuit eliminates a need to use multiple Class II converters for LED applications. Thereby saving costs, reducing circuit size, and increasing efficiency.

It will be appreciated that the specific examples of component values and/or model numbers presented herein are illustrative in nature and are not to be interpreted in a limiting sense. Other component values and/or models may be employed to achieve the described circuit functionality, as will be appreciated by those of skill.

The invention has been described with reference to the preferred embodiments. Obviously, modifications and alterations will occur to others upon reading and understanding the preceding detailed description. It is intended that the invention be construed as including all such modifications and alterations.

What is claimed is:

1. A circuit for controlling an LED lighting system, comprising:
    a single-converter control circuit with a primary winding T1;
    a first isolated output channel circuit with at least one secondary winding T2, T3 coupled to the primary winding T1 and a first output current sensing and conditioning circuit;
    at least a second isolated output channel with at least one secondary winding T6, T7 coupled to the primary winding T1 and a second output current sensing and conditioning circuit; and
    an output current regulation circuit that determines peak current output through the first and second isolated output channels;
    wherein the voltage regulation circuit includes a voltage-sensing winding T4, tightly coupled to the secondary windings, that detects a peak output voltage across each isolated output channel.

2. The circuit according to claim 1, wherein the output current regulation circuit includes first and second phototransistors that detect current signal from first and second photodiodes in the first and second isolated output channel circuits, respectively, to determine the peak current output in the first and second isolated output channel circuits.

3. The circuit according to claim 2, wherein each isolated output channel circuit includes a sensing resistor.

4. The circuit according to claim 3, wherein the first photodiode receives current through the sensing resistor and amplifier and provides current that is sensed by the first phototransistor.

5. The circuit according to claim 4, wherein the second photodiode receives current through a sensing resistor in the second output current sensing and conditioning circuit and provides current that is sensed by the second phototransistor.

6. The circuit according to claim 5, further comprising a peak output current regulating component that compares the current sensed by the first and second phototransistors, and determines which of the first and second isolated output channels has a higher peak output current.

7. The circuit according to claim 6, wherein the single-converter control circuit controls the power output of the isolated output channel having the highest output current to protect and regulate the isolated output channel having the highest output current.

8. The circuit according to claim 1, wherein the first isolated output channel comprises a secondary winding T5 that is tightly coupled to the voltage sensing winding T4, which supplies power to the output channel circuit.

9. The circuit according to claim 8, wherein the secondary winding T5 generates a dedicated voltage source.

10. The circuit according to claim 1, wherein the first and second isolated output channels are compliant with Class II output channel isolation requirements.

11. The circuit according to claim 1, wherein the single-converter control circuit comprises a control integrated circuit (IC).

12. The circuit according to claim 11, wherein the control IC has a low-side driver output pin coupled to a first half-bridge circuit.

13. The circuit according to claim 12, wherein the control IC has a high-side driver output pin coupled to a second half-bridge circuit.

14. An LED driver output channel regulation circuit, comprising
    a voltage-sensing winding T4 that senses voltage across a multi-channel secondary circuit;
    at least first and second photodiodes that transmit current, the first and second photodiodes being coupled to respective isolated output channel circuits in the secondary circuit;
    a peak current regulation component that compares current transmitted from the photodiodes, determines which of the isolated output channel circuits has a higher peak output current, and regulates the output current thereof.

15. The circuit according to claim 14, further comprising output current sensing and conditioning circuits, each including a photodiode, and coupled to respective isolated output channel circuits.

16. The circuit according to claim 15, wherein each output current sensing and conditioning circuit amplifies a current through a sensing resistor and provides the current as input to respective photodiodes.

17. The circuit according to claim 16, wherein the first photodiode forms an optocoupler with a first phototransistor coupled to the peak current regulation component, and the second photodiode forms an optocoupler with a second phototransistor coupled to the peak current regulation component.

18. The circuit according to claim 14, wherein the isolated output channel determined to have the higher peak output current is controlled using voltage regulation when the output voltage sensed at the voltage-sensing winding T4 exceeds a predetermined threshold, and using current regulation when the output voltage sensed at the voltage sensing winding T4 is less than or equal to the predetermined threshold.

* * * * *